Figures 1, 2:
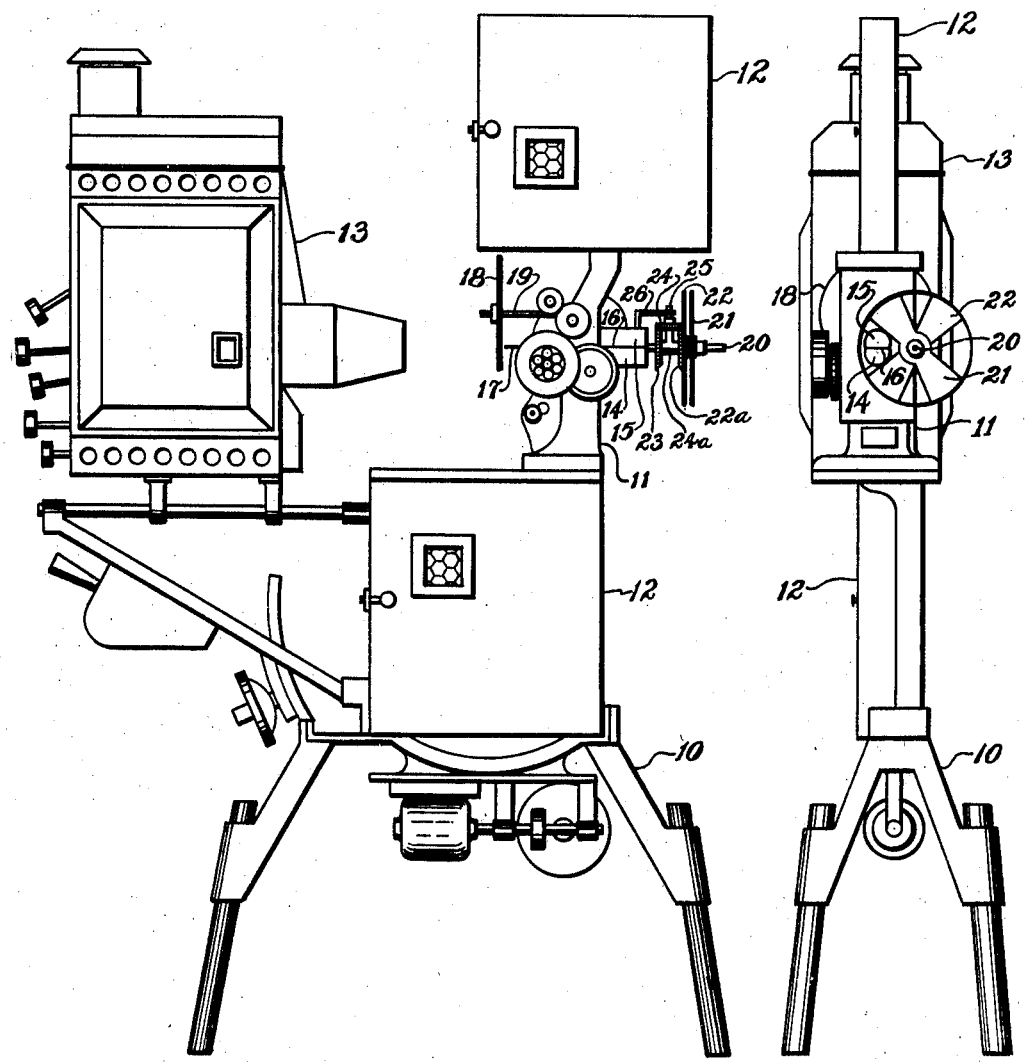

Nov. 10, 1936.  T. A. KILLMAN ET AL  2,060,503
NATURAL COLORED MOTION PICTURE APPARATUS
Filed Sept. 16, 1935   2 Sheets-Sheet 1

Inventors
Thomas A. Killman
Robert T. Killman

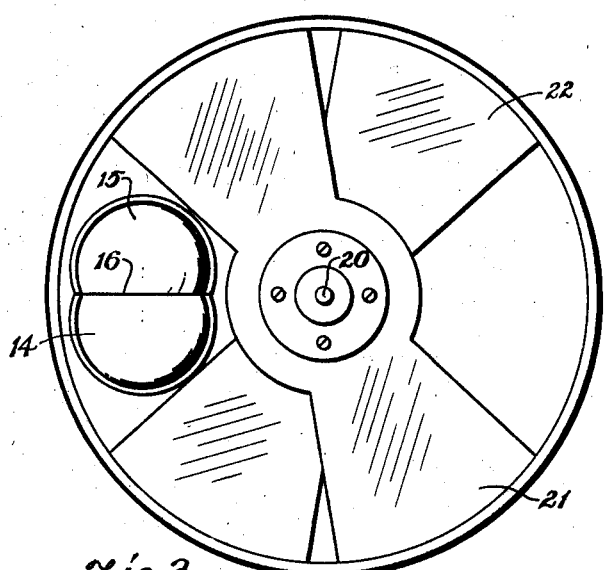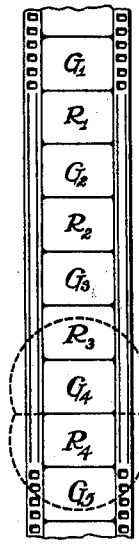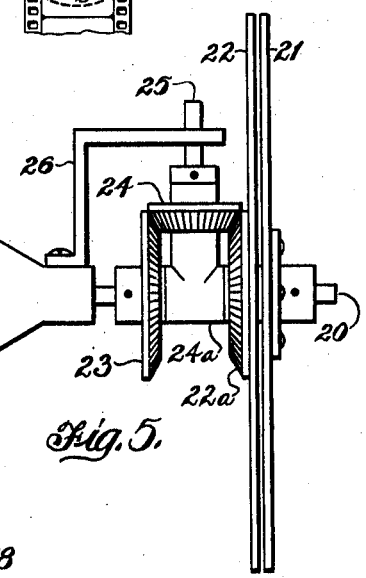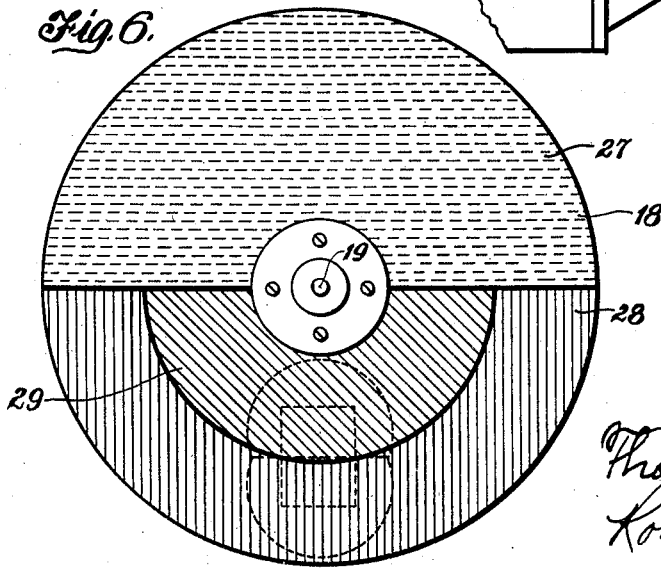

Patented Nov. 10, 1936

2,060,503

UNITED STATES PATENT OFFICE 2,060,503

NATURAL COLORED MOTION PICTURE APPARATUS

Thomas A. Killman and Robert T. Killman, Nashville, Tenn.

Application September 16, 1935, Serial No. 40,774

5 Claims. (Cl. 88—16.4)

This invention relates to a process of producing motion pictures in natural colors by the use of attachments which may be fitted to the standard machines now in use.

One of the objects of this invention is the elimination of all color fringe and color flicker in both moving and stationary objects together with the elimination of all lack of registration due to parallax, difference in motion phase and the like.

Another object of this invention is to evolve a method of producing motion pictures faithfully in the natural colors of the object, the method requring only slight modification of the standard machines and apparatus now in use.

This application refers specifically to a projector. The film with which this projector is intended to be used in the projection of natural colored pictures may be exposed in a camera such as that disclosed in our copending application filed February 26, 1936, Serial Number 65,857, which is a division of the present application. The essential characteristics of such film is that there are successively produced upon the film pairs of images of the object. The two images of a pair are made from the same viewpoint and are so timed that every point in one image is exposed through exactly the same interval or period of time as the corresponding point in the other image of the pair. The two images of a pair occupy adjacent frames on a standard film and are identical except that they are made through complementary color filters. The film is projected as follows:

The projector is provided with an aperture accommodating two adjacent frames, and a twin lens so adjusted that the two frames are superimposed upon the screen. The film is advanced one frame at a time, each frame being projected upon the screen twice, once with the frame with which it was made and once with the preceding or succeeding frame. A revolving color filter is so arranged that when two frames, which were made together, occupy the aperture, sectors of the filter having substantially the same color as that of the filter through which the images were made, are interposed between the film and the light source, so that each picture is projected upon the screen by light of substantially the same color as that which made it. The two pictures, since they were made from the same point, and during the same time interval, superimpose in perfect register and form a picture on the screen in natural colors and without apparent fringe. A special double shutter located in the beam from each lens at the point where the small aerial image is formed causes an identical dissolving effect of each component so that there is not left on the screen at any instant a picture made up of any improper proportions of the two components, as would be the case were the beams intercepted by the shutter one at a time.

The next movement of the film past the aperture presents two images not made at the same time and, therefore, in which moving objects will not occupy the same relative positions. At this time the revolving filter has turned so that there is interposed in the light beam a dense medium, such as smoked glass, having no color value but serving only to cut down the intensity of the light. The two frames are projected on the screen in black and white but of low intensity. This black and white picture prevents flicker which would be caused if the screen were left dark during this interval, and the pictures should have only sufficient brilliance to accomplish this result.

The mechanism by which these and other objects are attained is described in the following specifications and claims together with the accompanying drawings in which, Figure I is a side elevation of a standard motion picture projector having mechanism embodying our invention attached.

Figure II is an end elevation of the same.

Figure III is a front view of the special double shutter used on the projector.

Figure IV shows a short strip of positive film.

Figure V is a side view of the double shutter.

Figure VI is a back view of the revolving color filter used on the projector.

Reference being had more particularly to the drawings, 10 designates the base of a projecting machine supporting a projector head 11 and upper and lower film magazines 12. A lamp housing 13 is disposed to the rear of the head 11 and is designed to direct rays of light through the head 11. Within the head 11 is a film gate (not shown) containing an aperture of a size to accommodate two adjacent image frames, and with which is associated the standard and usual mechanism for feeding the film from one magazine 12 to the other magazine 12 through the head 11. The mechanism described up to this point is, with the exception of the double sized aperture, a standard projecting machine, and the description may be considered to apply not only to the type of projector shown in the drawings but also to any other suitable and standard projector. The present invention being designed to adapt a standard projector to the exhibition of motion pictures in natural colors without any modifications of the structure therein used, beyond removable additions thereto, contemplates the use of such a projector which may be readily adapted to natural color or black and white motion picture projection.

The regular single lens of the projector is replaced by the twin lenses 14 and 15 divided by the septum 16 which extends toward the film to a point very close to it. The optical centers of the twin lenses are spaced apart a distance equal to that between corresponding points on adjacent picture frames on the film. The upper lens 15 is designed to project the upper of the two frames occupying the double aperture space while the lower lens 14 is designed to project the lower frame. Lenses 14 and 15 are adjusted so that the two images are superimposed upon the screen.

Replacing the regular shutter on the standard shutter shaft 20 is the special double shutter comprising the blade member 21 which is set screwed or otherwise rigidly attached to shaft 20 for rotation therewith, and the blade member 22 having bevel gear 22a attached thereto and fitting loosely on shaft 20 for rotation thereon. A bevel gear 23 identical with gear 22a is fixed upon shaft 20. Fitting loosely upon shaft 20 between gears 22a and 23 is the fixture 24a supporting the pinion shaft 25 upon which is rotatably mounted the bevel pinion 24 cooperating with bevel gears 23 and 22a. Shaft 25 is prevented from rotating about shaft 20 by the arm 26 which is affixed in any suitable manner to some stationary portion of the projector as shown in Figure 5. Thus rotation of the shutter shaft 20 causes blade member 21 to rotate therewith and blade member 22 to rotate thereon in the opposite direction at the same speed. The blade members are so set that one blade member cuts off the light from lens 14 just as the other member cuts off the light from lens 15, the cut-offs being timed in consonance with the movement of the film by the intermittent. The blade members are placed at the point in the twin beams of light from the twin lens where the small aerial images are formed, so that as each blade member cuts off its beam the two pictures superimposed upon the screen dissolve simultaneously, but all the while the proper proportion of the colors is maintained. Thus color flicker due to the image of one color remaining on the screen longer than that of the other color or improper proportions of color during the period when the light beams are being cut off is substantially eliminated.

A second septum 17 extends rearward from the film to a point very close to a filter disk 18 rigidly mounted upon the shaft 19 which is mounted upon and geared in with the mechanism of the head 11 in such manner that shaft 19 revolves one time while shutter shaft 20 is revolving twice.

Filter disk 18 is made of glass or other transparent material and is best shown in Figure 6. This disk is divided along a diameter into two equal areas. One of these areas 27 is darkened, either by uniformly covering its surface with some dense medium of low light transmitting power, or by making opaque dots or lines on its surface. The purpose of this portion of the disk is to cut down the intensity of the light at the times when two pictures, not made at the same time are projected and superimposed upon the screen.

The other half of disk 18 is divided into two semi-annular spaces 28 and 29 which carry substantially complementary colors.

Although various combinations of complementary colors may be used, for convenience the inner semi-annular space 29 will be called green and the outer space 28 will be called red. The septum 17 lies in a plane at right angles to disk 18 and tangent or slightly chordal to the semi-circular division between the green space 29 and red space 28.

A portion of a positive film designed to be projected in this machine is shown in Figure 4. The letters G and R denote the color values recorded in the various frames of the film, G denoting a picture made through a green filter and R denoting a picture made through a red filter. The figures show to which pair each image belongs. Thus G1 and R1 were made at the same time and from the same viewpoint, G1 being made through a green filter and R1 being made through a red filter. G2 and R2 were made on the next exposure, G3 and R3 on the next and so on.

As the film passes through the projector, when two pictures of the same pair, that is the two pictures which were made at the same time, for instance G1 and R1, occupy the double aperture the filter disk 18 is so placed that its colored portions intercept the light beam from the lamphouse 13 to the film. The light passing through the green portion 29 of filter disk 18 passes through G1 and projects it in green light on the screen; the light passing through the red portion 28 of the filter disk 18 passes through R1 and projects it in red light on the screen, superimposing it upon the green image from G1. The septum 16 and 17 prevent intermingling of the colors in the machine.

When two frames or pictures, not of the same pair, that is, not made at the same time, as, for instance, R1 and G2, occupy the double aperture, the filter disk 18 is so placed that both R1 and G2 are projected and superimposed upon the screen by white light of comparatively low intensity. Thus color fringe, caused by the difference in motion phase, is substantially eliminated and at the same time flicker, due to too long period of screen darkness between colored pictures is obviated. The proper intensity of light to secure this result is obtained by adjusting the density or the proportion of opaque lines or spots to transparent portions on the area 27 of the filter disk 18. The slight tendency to wash out the color of the colored pictures is prevented by making the colored sections 28 and 29 of the filter disk of more intense colors.

Various modifications of the forms herein disclosed in detail will be apparent to those skilled in the art and it should not be understood that we are limited to these illustrative forms, except as indicated in the following claims.

We claim as our invention:

1. In a motion picture projector the combination of an aperture plate designed to accommodate two standard picture frames; intermittent means for advancing a film one frame at a time; a source of light; a rotatable filter plate interposed in the light beam between the film and light source, said filter plate being divided into halves along a diameter, one half bearing two semi-annular color filter areas of substantially complementary color, the other half of the filter plate being uniformly darkened and without color value, the rotation of said filter plate being so timed in consonance with the movement of the film that the portion of the plate bearing the two substantially complementary colors is interposed in the light beam at the time two frames, which were photographed at the same time, occupy the aperture, and the darkened portion of the plate is interposed in the light beam at the time two frames, which were not photographed at the same time, occupy the aperture; twin lenses adapted to receive the light beams from the two frames occupying the aperture and to focus them in superimposed relation upon a screen; a dividing septum extending from the filter plate to the film; a second septum extending from the film through and between the twin lenses; shutter means adapted to cut off simultaneously two light beams from the twin lenses, said means comprising a shutter shaft, a shutter blade mounted upon said shaft and adapted to be rotated thereby, a second shutter blade rotatably mounted upon said shaft, a bevel gear attached to said last mentioned blade, a bevel gear fixed upon the shaft, a bevel pinion shaft, a bevel pinion mounted thereon and meshing with the two bevel gears, stationary means supporting the bevel pinion shaft, said gearing causing the two shutter blades to rotate in opposite directions.

2. In an apparatus for the projection of motion pictures in natural colors, the combination of a film gate having an aperture of dimensions to embrace two adjacent picture fields of a film; partitions located on both sides of said gate and transversely bisecting the aperture thereof; a rotatable filter disk located in the rear of said gate, said disk being divided into halves along a diameter thereof, one half bearing two semi-annular color filter areas of substantially complementary color, the other half being darkened and without color value.

3. A method of producing motion pictures in natural colors consisting in simultaneously projecting the two images of a pair upon the screen in superposition, each picture being projected by light from a like colored filter to that through which it was photographed, and then projecting one picture of that pair with one picture of the next succeeding pair in superposition upon the screen, each picture being projected by light from a filter having no color value but of reduced intensity.

4. A method of exhibiting motion pictures in natural colors consisting in providing a succession of groups of images of a subject, each image of a group being made simultaneously with other images of that group and through an appropriate color filter, and simultaneously projecting the images of one group onto a screen in superposition through like filters to those used in the taking thereof, and then projecting images from different groups onto the screen in superposition by means of white light of reduced intensity.

5. In a colored motion picture projector a rotating filter disc, said disc being divided into halves along a diameter thereof, one half bearing two semi-annular color filter areas of substantially complementary color, the other half being uniformly darkened and without color value.

THOMAS A. KILLMAN.
ROBERT T. KILLMAN.